(12) United States Patent  (10) Patent No.: US 7,041,933 B2
Forrester et al.  (45) Date of Patent: May 9, 2006

(54) COMPLEX HOLE SHAPING (75) Inventors: Ronald E. Forrester, Florence, KY (US); Dwight Evans Kimberlin, Cincinnati, OH (US); Gregory J. Lang, Reading, OH (US)

(73) Assignee: Meyer Tool, Inc., Cincinnati, OH (US)

( * ) Notice: Subject to any disclaimer, the term of this patent is extended or adjusted under 35 U.S.C. 154(b) by 598 days.

(21) Appl. No.: 10/413,341

(22) Filed: Apr. 14, 2003

(65) Prior Publication Data

US 2004/0200807 A1 Oct. 14, 2004

(51) Int. Cl.
*B23H 1/00* (2006.01)
*B23H 9/14* (2006.01)

(52) U.S. Cl. .................................................. 219/69.17

(58) Field of Classification Search .............. 219/69.17; 29/889.721; 416/97 R; 205/665
See application file for complete search history.

(56) References Cited

U.S. PATENT DOCUMENTS

| | | | |
|---|---|---|---|
| RE29,399 E | 9/1977 | Inoue | |
| 4,215,261 A | 7/1980 | Briffod | |
| 4,224,495 A | 9/1980 | Fricker et al. | |
| 4,247,749 A | 1/1981 | Wavre | |
| 4,310,742 A | 1/1982 | Pfau | |
| 4,348,573 A | 9/1982 | El-Menshawy et al. | |
| 4,361,745 A | 11/1982 | Rupert et al. | |
| RE31,493 E | 1/1984 | Pfau | |
| 4,510,365 A | 4/1985 | MacGregor et al. | |
| 4,667,079 A | 5/1987 | Matsumura et al. | |
| 4,684,323 A * | 8/1987 | Field .................... | 416/97 R |
| 4,725,706 A | 2/1988 | Inoue | |
| 4,762,464 A | 8/1988 | Vertz et al. | |
| 4,769,520 A | 9/1988 | Balleys | |
| 4,808,785 A | 2/1989 | Vertz et al. | |
| 4,818,834 A | 4/1989 | Rupert | |
| 4,819,325 A | 4/1989 | Cross et al. | |
| 4,820,894 A | 4/1989 | Francois et al. | |
| 4,888,462 A | 12/1989 | Diot et al. | |
| 4,922,076 A | 5/1990 | Cross et al. | |
| 5,010,224 A | 4/1991 | Shirey et al. | |
| 5,023,422 A * | 6/1991 | Laughton et al. .......... | 219/69.2 |
| 5,043,553 A | 8/1991 | Corfe et al. | |
| 5,051,912 A | 9/1991 | Johanson et al. | |
| 5,125,035 A | 6/1992 | McCarthy et al. | |
| 5,243,166 A | 9/1993 | Nakayama | |

(Continued)

FOREIGN PATENT DOCUMENTS

| | | | |
|---|---|---|---|
| GB | 2211775 A | * | 7/1989 |
| JP | 63-28518 A | * | 2/1988 |
| JP | 2000-141069 A | * | 5/2000 |

OTHER PUBLICATIONS

Duffin, *Application Publication No. US2003/0004606*, Jan. 2, 2003.

Beeck et al., *Application Publication No. US2002/0127104*, Sep. 12, 2002.

*Primary Examiner*—Geoffrey S. Evans
(74) *Attorney, Agent, or Firm*—Wood, Herron & Evans, L.L.P.

(57) ABSTRACT

A method for forming a complex hole through a wall of a structure. The complex hole has a smaller cross-sectional area within the wall and an outer portion with a larger cross-sectional area adjacent a first surface of the wall. The complex hole further has an inner portion extending between the smaller cross-sectional area and an inlet opening on a second surface of the wall. The method uses an EDM process to automatically first, form an entry hole in the wall extending from the first surface to a first location inside the wall, and second, form the outer portion of the complex hole in a direction moving from the first location inside the wall toward the first surface, and third, form the inner portion of the complex hole.

21 Claims, 10 Drawing Sheets

U.S. PATENT DOCUMENTS

| | | |
|---|---|---|
| 5,281,084 A | 1/1994 | Noe et al. |
| 5,313,038 A | 5/1994 | Kildea |
| 5,352,859 A | 10/1994 | Kaneko et al. |
| 5,354,961 A | 10/1994 | Diot et al. |
| 5,360,957 A | 11/1994 | Haefner et al. |
| 5,382,133 A * | 1/1995 | Moore et al. ............... 415/115 |
| 5,391,850 A | 2/1995 | Mueller |
| 5,402,692 A | 4/1995 | Bennett |
| 5,410,117 A | 4/1995 | Reynier et al. |
| 5,605,639 A | 2/1997 | Banks et al. |
| 5,669,991 A | 9/1997 | DeFilippo |
| 5,683,600 A * | 11/1997 | Kelley et al. ............ 219/121.7 |
| 5,742,018 A | 4/1998 | Akemura |
| 5,756,956 A | 5/1998 | Sato et al. |
| 5,828,574 A | 10/1998 | Robinson et al. |
| 5,893,984 A | 4/1999 | Thompson |
| 5,919,380 A | 7/1999 | Magara et al. |
| 5,957,657 A | 9/1999 | Akita et al. |
| 5,959,865 A | 9/1999 | Milan et al. |
| 6,183,199 B1 * | 2/2001 | Beeck et al. ............... 416/97 R |
| 6,254,333 B1 | 7/2001 | Merry |
| 6,368,060 B1 | 4/2002 | Fehrenbach et al. |
| 6,369,343 B1 | 4/2002 | Krenz et al. |
| 6,384,364 B1 | 5/2002 | Wei et al. |
| 6,388,223 B1 | 5/2002 | Jones et al. |
| 6,403,910 B1 | 6/2002 | Stang et al. |
| 6,420,677 B1 | 7/2002 | Emer et al. |
| 6,454,930 B1 | 9/2002 | Derighetti |
| 6,489,582 B1 | 12/2002 | Roedl et al. |

\* cited by examiner

COMPLEX HOLE SHAPING

FIELD OF THE INVENTION

The present invention relates to manufacturing gas turbine engine components and, more particularly, to drilling complex cooling holes through the surface of a gas turbine engine component using only an EDM process.

BACKGROUND OF THE INVENTION

During operation, gas turbine engines, whether used for flight or stationary power generation, develop extremely high temperature and high velocity gases in a combustor portion of the engine. These gases are ducted on blades of a turbine rotor to cause rotation of the rotor and are redirected by the stator vanes onto additional rotor blades to produce more work. Because of the high heat of the gases, it is desirable to cool the blades and vanes to prevent damage and, to extend the useful life of, these engine components. It is known in the art that a turbine component such as that shown in FIG. 9 can be cooled by film cooling that is provided by a plurality of cooling holes.

Figure 9:
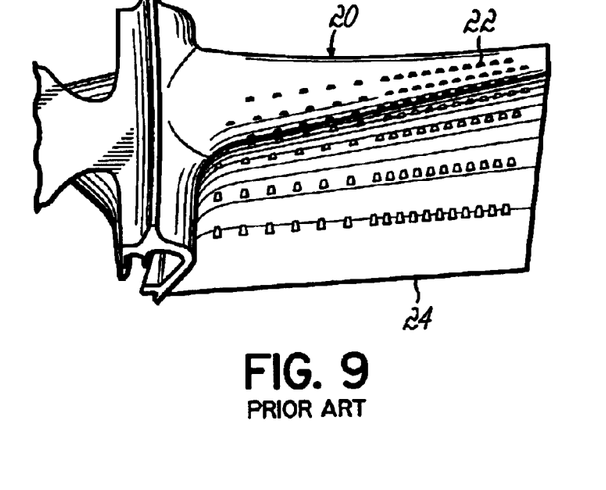
FIG. 9 is a partial perspective view of an example of a known turbine component that utilizes rows of cooling holes similar to the complex hole of FIG. 1.

A commonly used method of cooling a turbine component 20 is to duct cooling air through internal passages and then vent the cooling air through a plurality of cooling holes 22. This air cools internal surfaces of the component by convection and cools the components outer surfaces by film cooling. The cooling holes 22 are typically formed along a line substantially parallel to, and a selected distance from, a leading edge 24 of the component to provide a film of cooling air over a surface of the component when the cooling holes discharge air during engine operation. Other rows or arrays of cooling holes or vents may be formed in the blade and vane components of a rotor or stator of a turbine depending upon design constraints.

Figure 10:
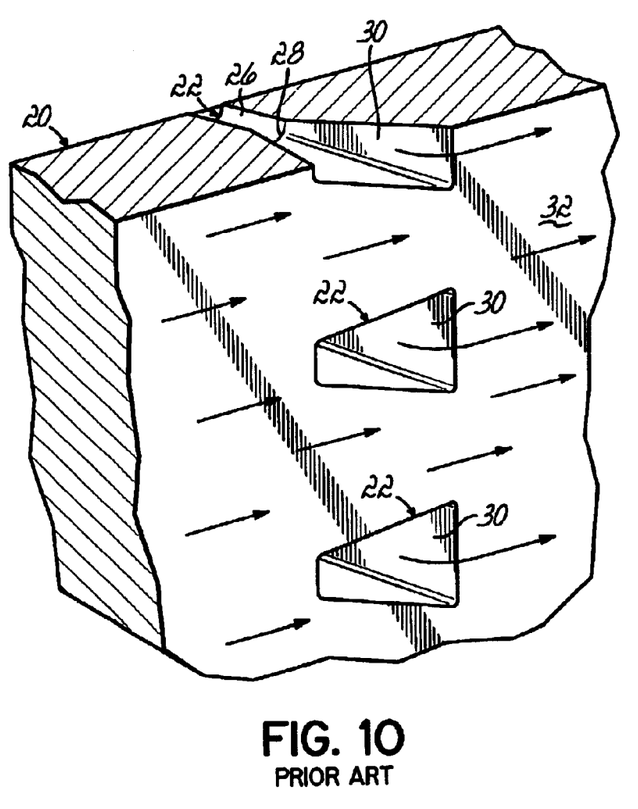
FIG. 10 is a partial perspective and cross-sectional view of a cooling hole in the turbine component illustrated in FIG. 9.

To facilitate the distribution of the cooling air substantially completely over the convex and concave surfaces of the blade airfoil or platform, as shown in FIG. 10, the upstream end of each cooling hole 22 has a generally cylindrical, inlet portion 26 that extends from a location 28 inside of a wall of the component 20. At the location 28, the cooling hole 22 then flares or diverges to provide a discharge portion 30 that terminates on an exterior surface 32 of the component 20 to be cooled by the air flow. The shape of the discharge end functions as a diffuser to reduce the velocity of the cooling airstreams being discharged from the cooling holes 22. The lower velocity cooling airstreams are more inclined to cling to the surface 32 for improved cooling. High quality cooling holes 22 with diffusers 30 provide superior performance but are costly and difficult to manufacture.

One known method of forming the cooling holes 22 uses an electrodischarge machining ("EDM") process, in which a first EDM tool is used to form the through-hole 26 and a second EDM tool is used to form the diffuser 30. For optimum performance, the diffuser must be very closely aligned with the through-hole; and that alignment is very difficult to maintain using multiple EDM tools.

Another known EDM process uses a single, comb-like tool that has a plurality of parallel EDM electrodes connected together at a common end to form a tool base. The parallel electrodes are spaced to correspond to the desired centerline spacing of adjacent cooling holes 22. The electrodes are shaped to correspond to the desired shape of the cooling hole; and therefore, a single electrode forms both the diffuser 30 and the through-hole 26. While this process often provides a consistent alignment of the diffuser cavity with the through-hole, the process is limited in that the comb-like tool is very fragile. The parallel electrodes are typically copper and are easily bent, and machining a turbine blade with a misaligned electrode may destroy the blade. Further, the comb-like tool often has to be replaced after only one machining cycle.

A further known process for forming the cooling holes 22 is a two step process. With one step, a laser drilling machine is used to drill the through-hole 26 of the cooling holes; and in another step, an EDM process is used to create the diffuser 30. This two step process requires a laser drilling machining and an EDM machine. Thus, after drilling the hole on the laser drilling machine, the part must be moved to the EDM machine in order to form the diffuser at the discharge end of the hole. The laser drilling process has the advantages of being able to very accurately locate each hole and drill each hole. However, the process of removing, remounting and precisely realigning the part on the EDM machine is very time consuming, and introduces opportunities for the stacking of errors. Further, laser drilling requires additional process steps of inserting material inside the part to absorb the laser beam when it breaks through to the part interior; and thereafter removing that material. In addition, a laser drilling machine is a very expensive piece of equipment; and the total time to drill and form all of the cooling holes in a part is substantial.

Another two step process is known in which a first EDM machine is used to drill the through-hole 26, and a second EDM machine uses a shaped tool to form the diffuser 30. While this process does not require an expensive laser drilling machine, it does have the disadvantages of requiring a shaped EDM tool and requiring the part be mounted and aligned on two different machines, which substantially increases the stacked error and the time required to process the part.

Thus, there is a continuing need for machinery and processes for forming complex cooling holes in gas turbine components that are faster, more flexible, more precise and less expensive than known machines and methods.

SUMMARY OF THE INVENTION

The present invention provides an EDM process that drills and shapes complex holes in a part substantially more accurately, quickly and less expensively than known machines and methods. With the EDM process of the present invention, complex holes are cut in one setup with a wire tool on a standard multi-axes EDM machine. Thus, neither a laser drilling machine nor special, formed tooling is required, thereby substantially reducing the costs of tooling and machinery. With the single-setup EDM process of the present invention, the processing time is substantially improved over the known two-setup process in which the part is setup first on a laser drilling machine and then on an EDM machine. Further, in the application of cutting complex cooling holes, the stacked tolerance of the single-setup EDM process of the present invention is less than the stacked tolerances of known EDM processes for cutting complex cooling holes.

In addition, the EDM process of the present invention has substantial flexibility. For example, the orientation of the hole centerline can be programmably and automatically changed from hole to hole without operator intervention. In addition, the size and shape of the diffuser or shaped portion of the hole can be programmably and automatically changed from hole to hole without operator intervention.

Thus, the EDM process of the present invention is especially useful in cutting cooling holes in gas turbine components, and such cooling holes can be cut more quickly, more precisely and with less operator intervention than known methods.

According to the principles of the present invention and in accordance with the described embodiments, the invention provides a method for forming a complex hole through a wall of a structure. The complex hole has a smaller cross-sectional area within the wall and an outer portion with a larger cross-sectional area adjacent a first surface of the wall. The complex hole further has an inner portion extending between the smaller cross-sectional area and an inlet opening on a second surface of the wall. The method uses an EDM process to automatically first, form an entry hole in the wall extending from the first surface to a first location inside the wall, and second, cut the outer portion of the complex hole by starting at the first location inside the wall and moving toward the first surface, and third, form the inner portion of the complex hole.

In another embodiment, the invention provides an air-cooled component of a gas turbine engine, which has a wall with an outer side defining an exterior surface of the component and an inner side having an inner surface. A cooling hole has an outlet with a larger cross-sectional area intersecting the exterior surface, and an inlet end intersecting the inner surface. The cooling hole further has an intermediate portion with a smaller cross-sectional area inside the wall that is formed by a first automated EDM process. A diffuser extends between the smaller cross-sectional area and the outlet end and is next formed by a second automated EDM process. The second automated EDM process first removes material closer to the smaller cross-section and thereafter removes material closer to the outlet end. An inlet portion extends between the smaller cross-sectional area and the inlet end, and the inlet end is then formed by a third EDM process.

These and other objects and advantages of the present invention will become more readily apparent during the following detailed description taken in conjunction with the drawings herein.

DETAILED DESCRIPTION OF THE INVENTION

Figure 1A:
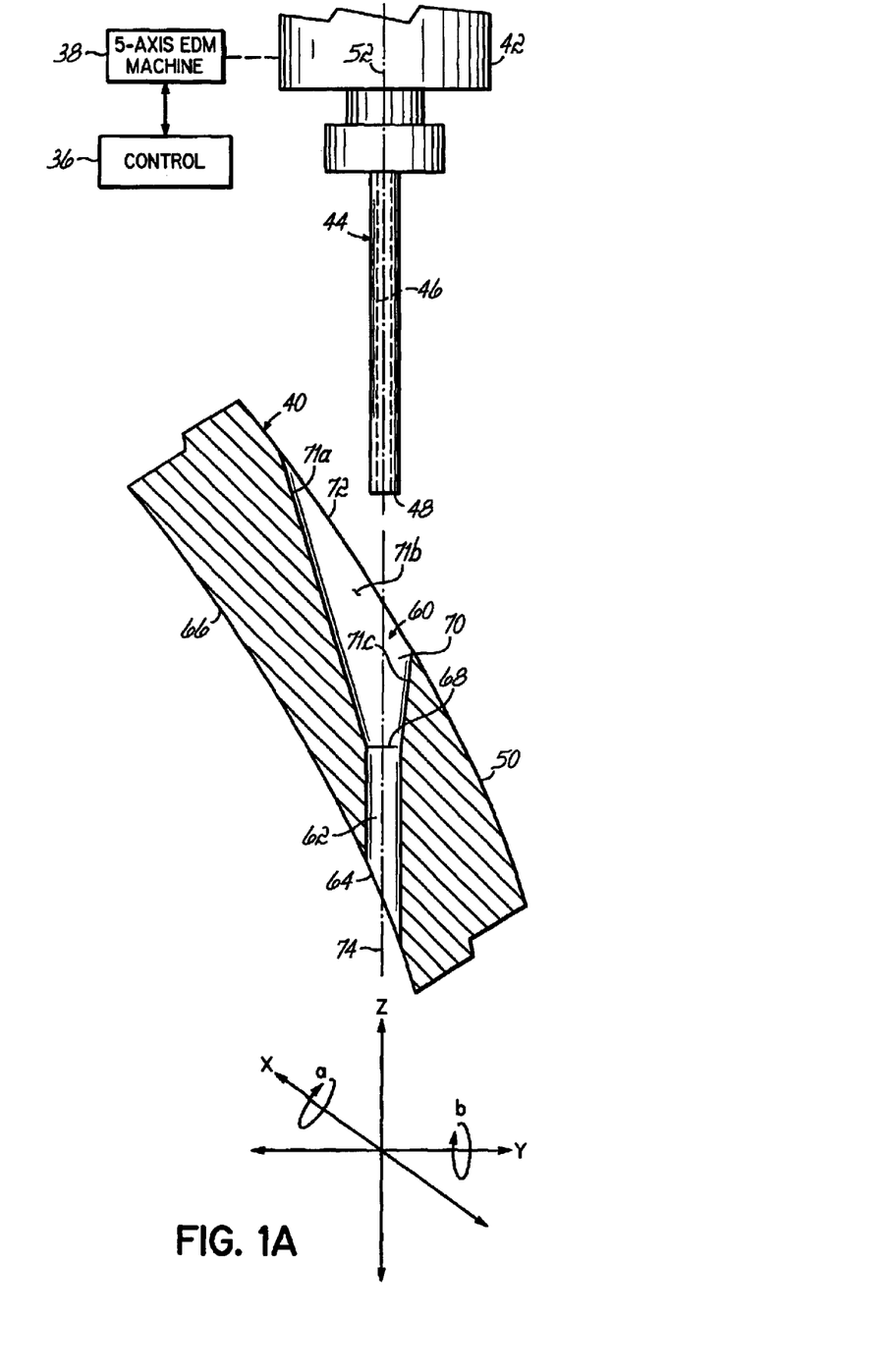
FIG. 1A is a cross-sectional side view of a wire EDM tool and a complex hole formed in a part by the wire EDM tool in accordance with the principles of the present invention.
Figure 1B:
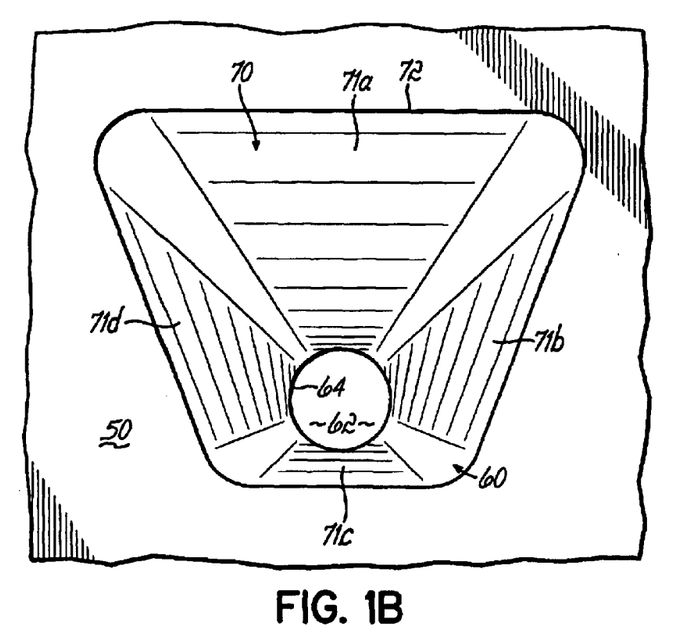
FIG. 1B is a top elevation view directed down the centerline of the complex hole of FIG. 1A.

FIGS. 1A and 1B illustrate an example of a complex hole, for example, a cooling hole, that can be cut in a turbine component, a portion of which is shown at 40, using an EDM wire tool 44 and the process of the present invention. As will be appreciated, the geometry of any particular hole can vary from hole to hole and from part to part. The cooling hole 60 has an inlet portion 62 that is normally substantially circular and extends from an inlet orifice 64 on a turbine component inner surface 66 to a location 68 inside a wall of the component 40. The cooling hole 60 further has a cavity portion forming discharge or diffuser portion 70 that extends from the interior location 68 to a discharge outlet orifice 72 on the exterior surface 50 of the turbine component 40. The diffuser 70 has sidewalls 71a, 71b, 71c and 71d that are angled with respect to a centerline 74 of the inlet portion 62. Intersections of the sidewalls 71a–71d with the inlet portion 62 are used to define a plane; and the intersection of that plane with the centerline 74 is the interior location 68 that, for purposes of this description, will be defined as the "hole shape depth". Often, the intersections of the sidewalls 71a–71d with the inlet portion 62 define a plane that is substantially perpendicular to the cooling hole centerline 74.

The cooling hole cutting process to be subsequently described in detail comprises first, using the wire tool 44 to drill an entry or guide hole 65 down to the hole shape depth 68. Thereafter, the wire tool 44 is retracted to successive Z-axis positions and moved in respective cutting paths substantially perpendicular to the cooling hole centerline 74. Thus, the diffuser 70 is cut to its desired shape by moving the wire EDM tool 44 from the inside location 68 toward the outside surface 50 of the turbine component 40. This hole shaping process is generally referred to herein as an inside-out machining process. After the diffuser 70 has been shaped using this inside-out cutting process, the wire EDM tool 44 then drills out the inlet portion 62, thereby completing the cooling hole 60.

As shown in FIG. 1A, the turbine component 40 is mounted on a multi-axes EDM machine 38 such as an EDM machine having six axes of motion and a spindle 42. As described herein, the invention is practiced using only five of the six axes of the EDM machine. The EDM tool 44 is mounted in the spindle 42 and is rotatable during the EDM process in a known manner. The EDM tool 44 is a commercially available hollow wire tool and can be made of brass, copper, graphite or other materials. The EDM tool 44 has a longitudinally extending passage 46 through which a dielectric, for example, deionized water or mineral oil, is provided in a known manner. The multi-axes EDM machine 38 is connected to a programmable control 36 with servo-controlled drives that are operable to simultaneously move an end 48 of the tool 44 along mutually perpendicular X, Y, and Z axes of linear motion to position at a desired point with respect to an external surface 50 of the turbine component 40. Further, the A-axis rotates the component 40 about an axis of rotation coincident with the X-axis, and the B-axis rotates the turbine component 40 about an axis of rotation coincident with the Y-axis. Thus, the A and B rotary axes permit a centerline 52 of the tool 44 to be oriented at any angle with respect to the component exterior surface 50. Further, the control 36 is able to move all of the axes of motion simultaneously to move the tool centerline 52 to a desired position and orientation.

The EDM machine 38 further has a W-axis of linear motion that is mounted on a Z-axis slide and provides a linear axis of motion parallel to the Z-axis. After the Z-axis servodrive is used to position the EDM tool 44 with respect to a part, the W-axis is used to provide a servodrive for the EDM tool 44 when performing a hole drilling EDM process in the Z-axis direction. An S-axis drive is used to control and vary, if desired, the angular velocity of the rotating EDM tool 44; however, the present invention can be practiced with the EDM tool 44 rotating at a constant speed. The EDM machine 38 also has a C-axis that can rotate the component 40 about an axis of rotation coincident with the Z-axis, however, the present invention can often be practiced without requiring C-axis motion.

Figure 11:
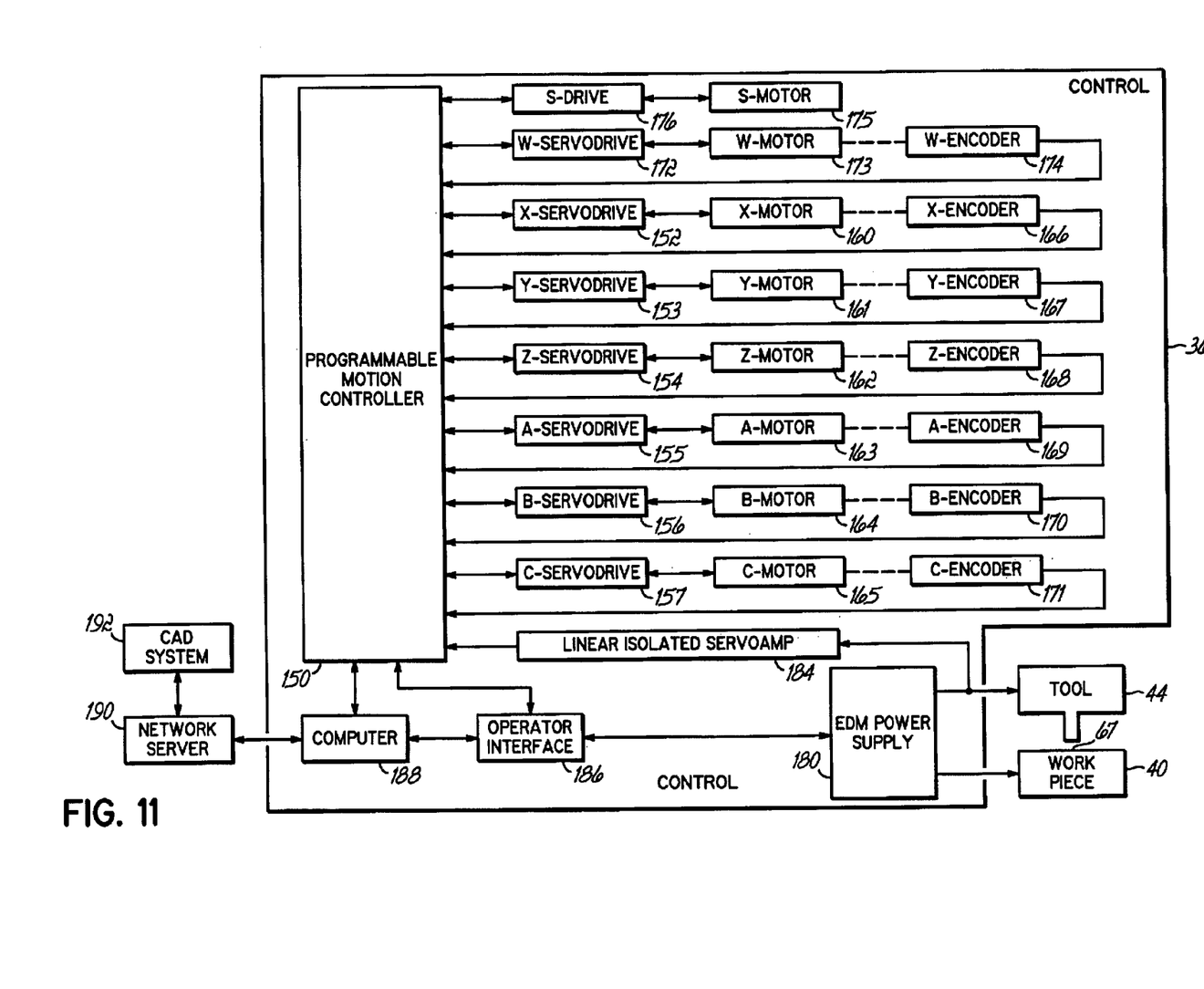
FIG. 11 is a schematic block diagram of a control for operating an EDM machine of the type used to cut the complex hole of FIG. 1.

Referring to FIG. 11, the control 36 includes a programmable motion controller 150 that controls relative motion between the EDM tool 44 and the turbine component 40 in a known manner. The motion controller 150 provides command signals to respective X, Y, Z, A, B, C servo drives 152–157, respectively. The servo drives 152–157 provide output signals commanding the operation of respective X, Y, Z, A, B, C motors 160–165, respectively. X, Y, Z, A, B, C encoders 166–171 are mechanically coupled to respective motors 160–165 and provide respective feedback signals to the motion controller 150. Motion of the EDM tool 44 during a hole drilling EDM process, is controlled by the motion controller 150 providing command signals to a W-servo drive 172 that, in turn, commands operation of a W-motor 173. A W-encoder 174 is mechanically coupled to the W-motor 173 and provides feedback signals to the motion controller 150. An S-motor 175 providing a rotational speed of the EDM tool 44 is operated by an S-drive 176 that receives command signals from the motion controller 150.

The programmable motion controller 150 is also connected to an EDM power supply 180 that is electrically connected to the EDM tool 44 and workpiece 40 in a known manner. The EDM power supply 180 may be regulated or unregulated, and operation of the EDM power supply 180 is initiated and terminated at the appropriate times by the motion controller 150. When operating, the EDM power supply 180 provides pulsed signals that result in arcing or sparking across an EDM gap 67 between the EDM tool 44 and the workpiece 40 to execute the EDM process in a known manner. A voltage feedback signal representing gap voltage is fed back to the programmable motion controller 150 via a linear isolated servo amp 184. The motion controller 150 utilizes the voltage feedback signal in determining a feedrate of the EDM tool 44 during the EDM process.

The control 36 further includes an operator interface 186 that provides various user operable input devices, for example, pushbuttons, switches, etc., as well as various sensory perceptible output devices, for example, lights, a visual display such as an LCD screen, etc. The operator interface 186 permits the operator to set various parameters within the EDM power supply 180 as well as provide inputs to manually operate the various servodrives. Also part of the control 36 is a computer 188, which is an industrialized PC that provides a communications interface between a network server 190 and the programmable motion controller 150 as well as the operator interface 186.

A CAD system 192 is also connected to the network server 190 and is operable to provide input data to the control 36. The CAD system 192 includes a digital model of the turbine component illustrated in FIG. 9. Within that model, the position and orientation of respective centerlines of the cooling holes are defined with respect to X, Y, Z, A, B coordinates. In a premanufacturing process, the position and orientation of the centerlines of the cooling holes to be cut are extracted from the model using the CAD system 192 and made available to the network server 190 as a set of input data. The operator uses the operator interface 186 to retrieve, via the network server 190, a set of input data from the CAD system 192 that corresponds to the turbine component to be machined on the EDM machine. That input data is stored in the computer 188.

The input data was created in a program language and data format that is compatible with the CAD system 192. However, the input data is to be utilized by the programmable motion controller 150 that has its own program language and data format. The computer 188 is operative to translate the input data from the program language and data formats of the CAD system 192 to a program language and data format that are usable by the programmable motion controller 150.

The programmable motion controller 150 has two major functions. First, it must modify the input data that was created with respect to a coordinate system in the CAD system 192 to a coordinate system that is specific to the EDM machine being used. As will be appreciated, the physical structure of EDM machines varies with different models and manufacturers. For example, the configuration of machine slides representing different axes of motion vary; the length of travel of the axes of motion vary; the alignment or home positions for the axes of motion vary, etc. While all of the different machine configurations are capable of machining the turbine component to provide the desired cooling hole, the different physical configurations require respectively different input data. Therefore, the first function of the motion controller 150 is to offset and/or reorient the input data from the computer 188 to input data that is specific to the EDM machine on which the turbine component is to be machined. In addition, in a known manner, a setup procedure is executed by the operator during which the EDM tool is aligned with a fixture holding the turbine component; and in that process, the motion controller 150 is provided further data that precisely identifies the location of the turbine component with respect to the machine coordinate system. Thus, with this system architecture, a common set of part data can be used with a wide range of different EDM machines.

Second, once a hole cutting cycle of operation is initiated, the motion controller 150 is operable to create a path of relative motion between the EDM tool 44 and the turbine component 40. A path of motion is defined by path segments, the endpoints of which are defined by coordinate values in the X, Y, Z, A, B axes. Thus, the endpoints collectively represent a locus of points generally defining the desired path of relative motion between the EDM tool 44 and the turbine component 44. The motion controller 150 linearly interpolates EDM tool motion along a path segment between the endpoints.

Figure 2:
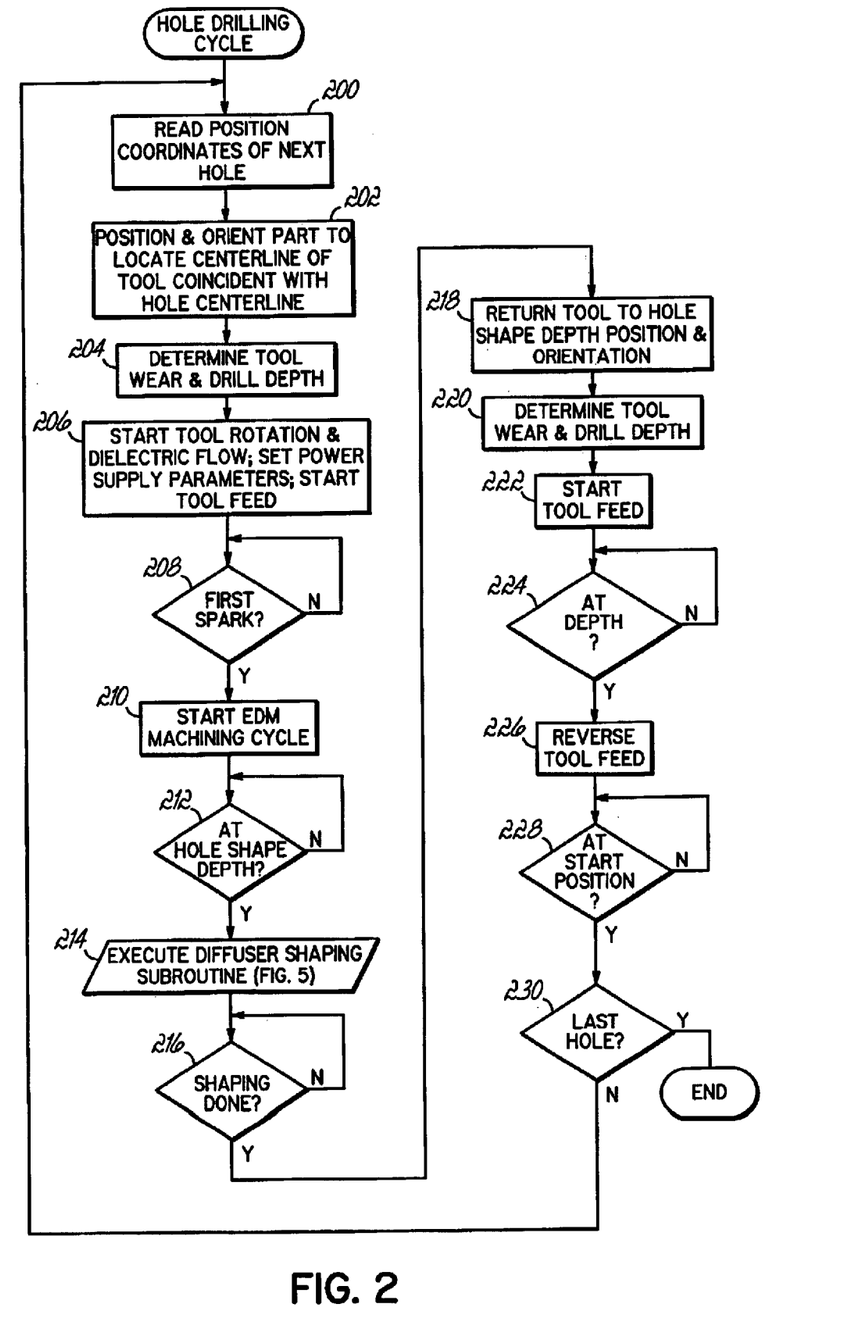
FIG. 2 is a flowchart of hole drilling cycle for cutting the complex hole of FIG. 1.

Referring to FIG. 2, a hole drilling cycle executable by the programmable motion controller 150 requires first, at 200, that the coordinates of the next hole be read. At 202, the motion controller 150 provides output signals to various servodrives 152–157, that, in turn, command respective motors 160–165 to operate in a coordinated manner to move the turbine component 40 and spindle 42 relative to each other, such that the EDM tool centerline 52 is colinear with a desired orientation of the first cooling hole centerline 74 as shown in FIG. 1A. Next, the hole drilling process requires, at 204, a determination of tool wear and the first increment of tool displacement to bring the tool end 48 to the hole shape depth location 68 shown in FIG. 3. For any given EDM tool and application, variations in tool wear are often dependent on the power supply settings; and in this application, the power supply is set to values that minimize tool wear. Expected tool wear is often dimensioned as a percentage of tool path displacement along the Z-axis and may be input by the operator using the operator interface 186 or calculated by the motion controller 150. Regardless of how it is determined, the motion controller 150, at 204, creates a path segment endpoint that represents a displacement of the EDM tool 44 along the Z-axis that has been increased by the amount of expected tool wear.

Next, at 206, rotation of the EDM tool 44 about the Z-axis and a flow of dielectric through the EDM tool central passage 46 are initiated by the motion controller 150 and/or the operator. In addition, the power supply parameters are set to their desired values either automatically by the motion controller 150 and/or manually by the operator. The power supply parameters are set to minimize tool wear in drilling the hole 65 to the hole shape depth 68. Further, in determining the power supply parameters, consideration is also given to machining a good entrance of the hole 65 with the EDM tool 44. The EDM tool 44, with its centerflow of dielectric, approaches the component exterior surface 50 at an angle; and thus, the EDM tool 44 has a tendency to skid or deflect slightly over the surface 50 until a hole entrance is established. It has been found that some combinations of lower power supply settings and feedrate provide a better hole entrance that is truer to size, and the best combination of power supply settings and feedrate is often determined experimentally by drilling test holes and observing and measuring the resultant holes.

The motion controller 150 then provides output signals to the W-axis servo drive 154, and the W-axis motor 162 advances the EDM tool 44 in a Z-axis direction toward the turbine component outer surface 50. The feedrate of that motion is normally slower and depending on the application, may or may not be under the control of the machine operator. That advance feed of the tool 44 continues until the motion controller 150 by monitoring the gap voltage detects, at 208, the first spark(s) and in response thereto, at 210, initiates the EDM cycle. During an EDM cycle, advancement of the EDM tool 44 along the W-axis is regulated by electrical conditions that are detected in the gap 67 between the EDM tool end 48 and the turbine component 40, for example, gap voltage is used to control the feedrate of the EDM tool 44. Numerous methods for controlling an EDM machining cycle are known and therefore, will not be described in further detail.

Figure 3:
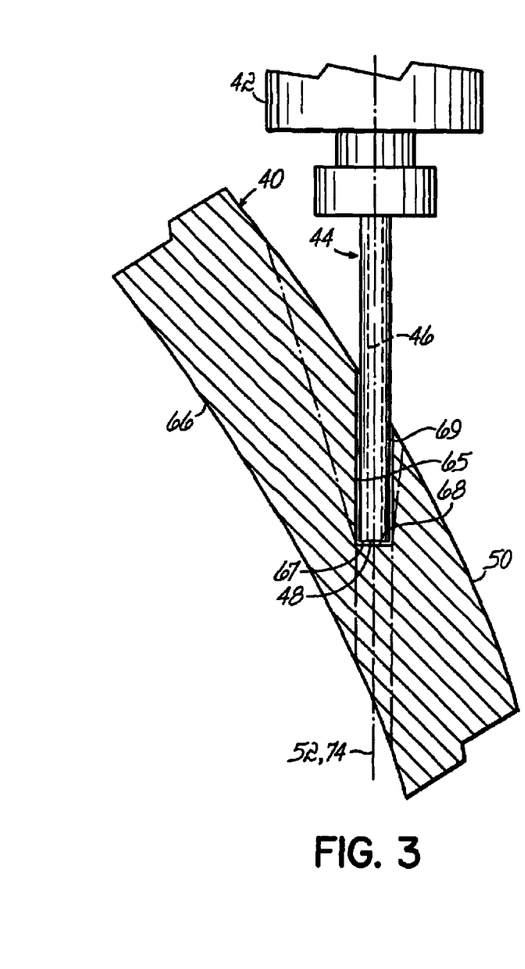
FIG. 3 is a cross-sectional side view of the complex hole illustrating the EDM tool at the end of a first hole drilling operation.

As the EDM process continues, referring to FIG. 3, a generally circular hole 65 is drilled into the turbine component 40. During that drilling process, dielectric fluid is flowing through the central passage 46 of the EDM tool and out the tool end 48. The dielectric fluid flows through a machining gap 67 between the EDM tool end 48 and the bottom of the hole 65. The dielectric fluid then flows through a gap 69 between an external surface of the EDM tool 44 and a wall of the hole 65 being drilled before exiting the hole 65 and flowing over the turbine component exterior surface 50. That dielectric fluid flow provides a beneficial flushing action that quickly clears the gaps 67, 69 of debris from the EDM process. Such an efficient dielectric flushing action provides more consistent electrical conditions in the gap and therefore, provides a more efficient EDM process with minimal tool wear. With minimal tool wear, the control 36 is able to accurately move the EDM tool end 48 to the hole shape depth 68 with excellent repeatability from hole to hole.

Figure 4A:
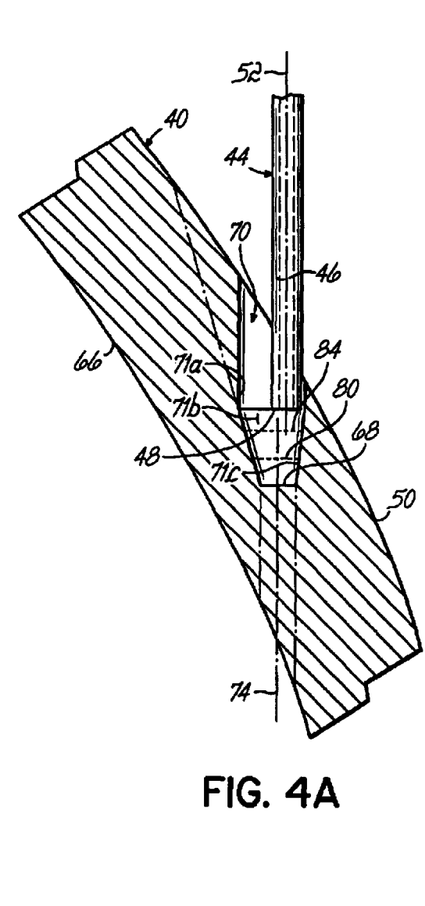
FIG. 4A is a cross-sectional side view of the complex hole illustrating successive retracted positions of the EDM tool during an inside-out hole shaping process used to cut the complex hole of FIG. 1.
Figure 4B:
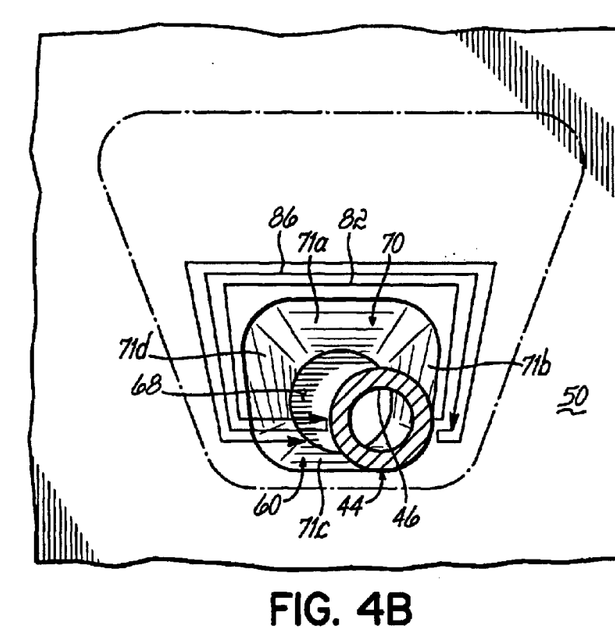
FIG. 4B is a top elevation view directed down the centerline of the complex hole schematically illustrating one embodiment for providing cutting paths of the EDM tool at the retracted positions shown in FIG. 4A.

When the motion controller 150 detects, at 212, that the tool 44 has moved through the incremental displacement to the hole shape depth 68, the motion-controller 150 then executes, at 214, a diffuser shaping subroutine. In general, referring to FIGS. 4A and 4B, the diffuser 70 is cut by executing an inside-out machining process. The EDM tool 44 is first retracted through a Z-axis displacement to a position 80. The motion controller then moves the EDM tool 44 in a first direction, for example, a counterclockwise direction, along a first cutting path 82, thereby cutting the desired shape of the diffuser 70 at the Z-axis position 80. It should be noted that prior to executing the first path 82, the EDM tool 44 is moved or offset slightly in a direction toward sidewall 71c, so that a cut along that wall is as linear and smooth as possible. Such an offset compensates for any overburn or other artifacts that may result from the initial hole drilling process. Next, the EDM tool is retracted through another displacement to a Z-axis position 84 (FIG. 4A). The motion controller 150 then provides output signals causing the EDM tool to move 44 in an opposite direction, for example, a clockwise direction, as shown in FIG. 4B, along a second cutting path 86, which cuts the desired shape of the diffuser 70 at the Z-axis position 84. That process continues until the complete diffuser 70 has been cut by the inside-out machining process.

The inside-out cutting process has several advantages. First, as shown in FIG. 4A, the diffuser portion 70 is being cut over its full depth at any given Z-axis location of the EDM tool 44. Thus, when the EDM tool 44 is being moved along the cutting paths, most of the EDM cutting action results from machining with a side surface of the rotating EDM tool 44. The outer circumferential area of the EDM tool 44 in contact with the turbine component 40 is an area substantially larger than the area over the tool end 48. Therefore, longitudinal tool wear is substantially less than if the diffuser were using only the tool end 48 to cut out the diffuser. Further, in many applications, the longitudinal tool wear is so small that tool length wear compensation can be eliminated during the execution of the diffuser shaping subroutine and still machine the diffuser 70 to acceptable specifications.

Further, by cutting the diffuser portion 70 prior to cutting the cooling hole inlet 62 (FIG. 1), the EDM tool 44 is operating in a blind hole or cavity; and the flow of coolant continues to flush up around the sides of the tool 44 to provide a rapid and thorough removal of cutting debris. That efficient dielectric flow provides more consistent machining gap conditions and a more efficient and predictable cutting process. A third advantage of using the inside-out cutting process is that a significantly larger area of the rotating tool is being used to cut the diffuser. Hence, in many applications, the diffuser portion 70 can be cut in less time than if the diffuser portion were being cut from the outside-in using only the tool end 48.

Figure 5:
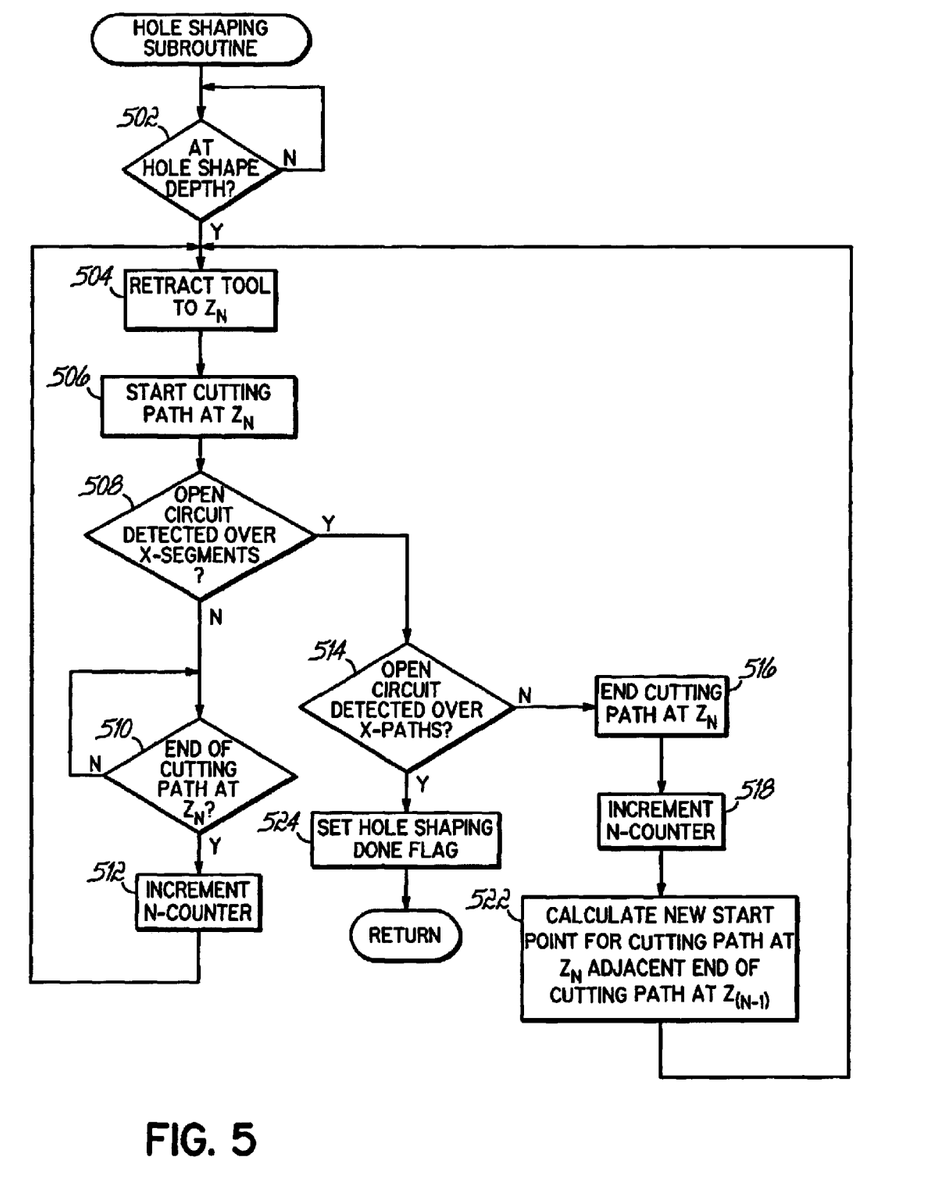
FIG. 5 is a flowchart of a hole shaping cycle for cutting a discharge or diffuser portion of the complex hole of FIG. 1.

Referring to FIG. 5, the motion controller 150 first, at 502, determines that the EDM cutting tool 44 is at the hole shape depth 68. Thereafter, the motion controller commands, at 504, the Z-axis servodrive 154 to retract the EDM cutting tool 44 through a Z-axis displacement, for example, a displacement of 0.002 of an inch, which would place the tool at a position 80 shown in FIG. 4A. The motion controller 150 then commands, at 506, the X and Y axis servodrives 152, 153 to operate the X and Y motors 160, 161, thereby providing relative motion between the EDM tool 44 and the turbine component 40, such that the EDM tool 44 is moved along a first cutting path, for example, path 82 of FIG. 4B. The motion controller 150 then determines, at 508, whether a machining gap open circuit condition has been continuously detected over a number of path segments. Assuming that such a condition does not exist, the motion controller then determines, at 510, when the EDM tool 44 has been moved to the end of the first cutting path 82. Next, the motion controller increments, at 512, an N-counter which directs the motion controller to the next Z-axis displacement that retracts the EDM tool 44 to the next Z-axis position 84 (FIG. 4A) at which a cutting path 86 (FIG. 4B) is executed. Thus, the motion controller 150 iterates the process of steps 504–512 of FIG. 5 to shape the diffuser 70 by cutting slices of the diffuser 70 at successive retracted positions of the EDM tool 44 starting from the inside tool position 68 and moving toward the turbine component exterior surface 50.

Figure 6A:
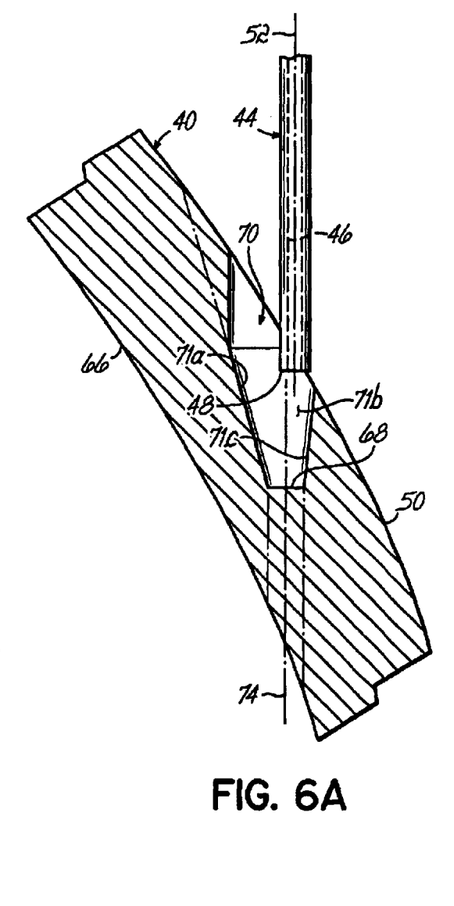
FIG. 6A is a cross-sectional side view of the complex hole illustrating a position of the EDM tool, where during motion along a cutting path, the EDM tool is cutting only a portion of the complex hole of FIG. 1.

A full contouring path that moves the EDM tool 44 adjacent all four sidewalls 71a–71d of the diffuser 70 is programmed for each Z-axis position as the EDM cutting tool 44 is retracted out of the diffuser 70. As shown in FIG. 6A, as the EDM tool 44 is retracted outward, when moving along outer cutting paths, it maintains a machining gap with sidewall 71a and inner portions of sidewalls 71b, 71d. However, the oblique orientation of the tool centerline 52 with the component surface 50 causes the EDM tool 44 to move away from outer portions of the sidewalls 71b, 71d and the sidewall 71c. In that situation, a machining gap, that is, a desired spacing between the EDM cutting tool 44 and the sidewall, is lost; and an open circuit condition arises. Thus, the EDM tool 44 is simply moving in air and not removing any material. By monitoring the gap voltage, the motion controller 150 is able to detect an open circuit condition and increase the feedrate in response thereto, and that capability is effective to reduce the time that the EDM tool 44 is moving in air.

An alternative approach is to revise the cutting path in response to detecting a loss of the machining gap and a prolonged open circuit condition. As indicated at 508 of FIG. 5, the motion controller 150 has the capability of detecting an open circuit condition over one or more tool path segments. While executing a diffuser shaping subroutine, if the motion controller 150 detects a continuous open circuit condition over a number of path segments, for example, 3 segments, within a particular contouring path, the motion controller then proceeds to determine, at 514, whether such open circuit condition has occurred over a consecutive number of contouring paths. If not, the motion controller then proceeds, at 516, to stop the EDM tool motion, thereby creating a nonprogrammed end point 96, (FIG. 6B), of the current contouring path 94. Next, the motion controller, at 518, increments the N-counter to identify the next Z-axis displacement and the contouring path associated therewith. Thereafter, at 522, the motion controller 150 calculates a new starting point 98 for the next contouring path 100 associated with the current Z-axis displacement that corresponds most closely to the end point 96 of the previous contouring path 94. The motion controller then, at 504, retracts the EDM tool 44 through the next Z-axis displacement; and, at 506, initiates the next cutting path by moving the EDM tool directly to the new start point 98 of the contouring path 100.

Figure 6B:
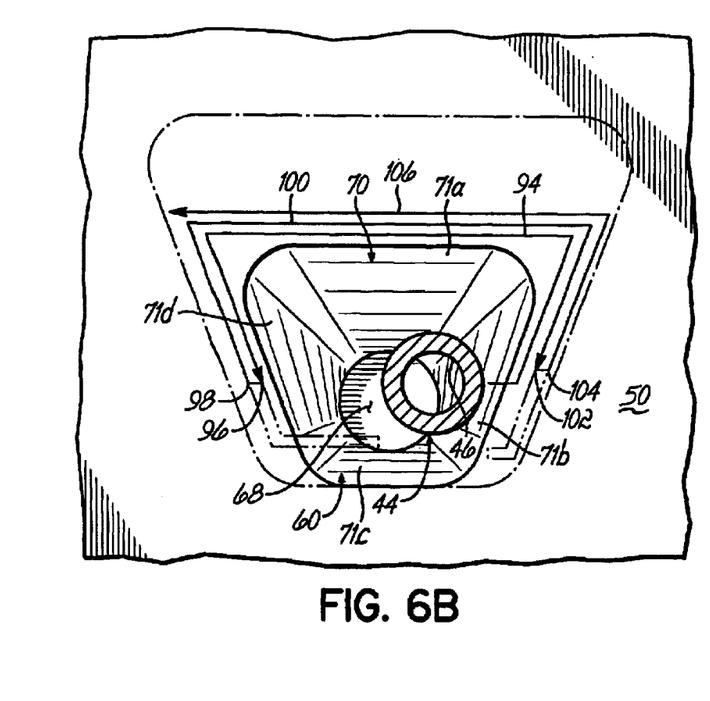
FIG. 6B is a top elevation view directed down the centerline of the complex hole schematically illustrating cutting paths of the EDM tool at the retracted position shown in FIG. 6A.

The prior end point 96 was determined only after cutting air over at least one path segment, and therefore, motion of the EDM tool 44 to the new start point 98 after another Z-axis retraction is also going to be a motion in air. The process then continues as previously described to move the EDM tool along the contouring path 100 until the motion controller again determines, at 508, that an open circuit condition has continuously been detected over a number of path segments. At that point, the EDM tool motion is stopped, thereby creating a nonprogrammed end point 102. After again retracting the EDM tool 44 through another Z-displacement, at 520, the motion controller determines, at 522, a new start point 104 for the subsequent contouring path 106. Thus, the hole shaping process is operable to detect when the EDM tool 44 is no longer machining a sidewall of the diffuser 70 and immediately terminates a current cutting path and initiates a subsequent cutting path, thereby optimizing the cycle time for machining diffuser 70.

Figure 7A:
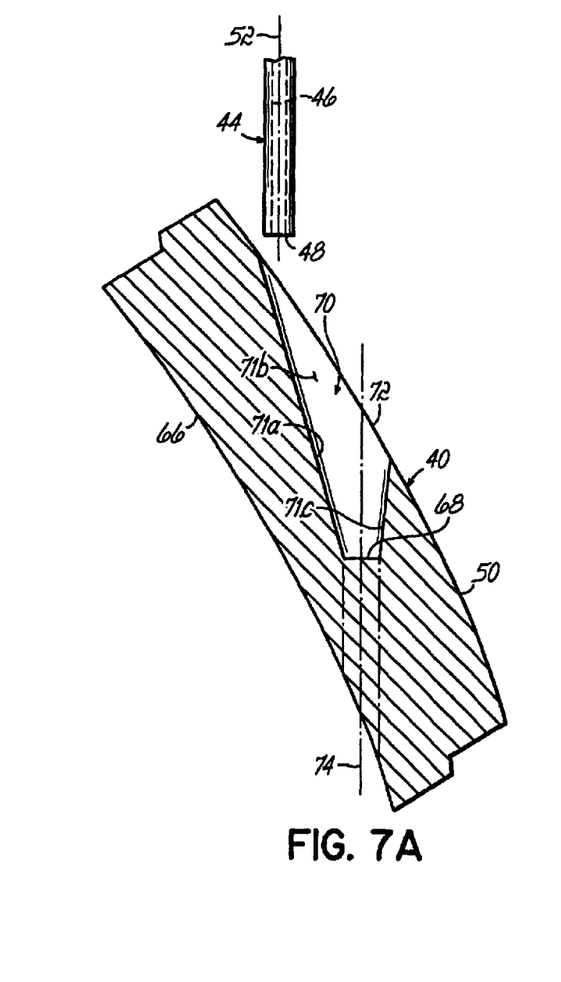
FIG. 7A is a cross-sectional side view of the complex hole illustrating a position of the EDM tool where the EDM tool has finished cutting the complex hole of FIG. 1.
Figure 7B:
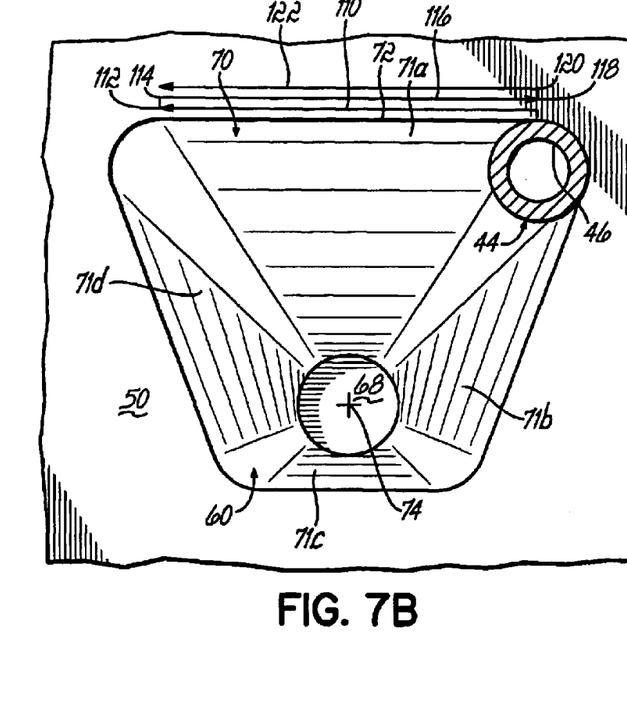
FIG. 7B is a top elevation view directed down the centerline of the complex hole schematically illustrating cutting paths of the EDM tool at the retracted position shown in FIG. 7A.

Progressive cutting of the diffuser 70 by the inside-out machining process results in the EOM tool 44 being spaced away from all of the diffuser sidewalls 71a–71d as shown in FIG. 7A. Therefore, during an entire contouring path, the EDM tool 44 is cutting air and a continuous open circuit condition exits. The previously described process of steps 514–522 detects an open circuit condition over a number of segments during a contouring path 110 shown in FIG. 7B. The motion controller 150 terminates the path 110 at an end point 112 and then proceeds to establish a new starting point 114 for a subsequent path 116. Again, if the EDM tool 44 is cutting air, the motion controller terminates the path 116 at a nonprogrammed end point 118, retracts the EDM tool 44 and determines a new starting point 120 for the next contouring path 122. Thus, the motion controller is able to determine, at 514, that an open circuit condition has continuously existed over a number, for example, 3, cutting paths. Upon detecting that condition, the motion controller then sets a hole-shaping done flag, thereby ending the diffuser shaping subroutine of FIG. 5 and returning the hole drilling process to step 216 of FIG. 2.

Figure 8:
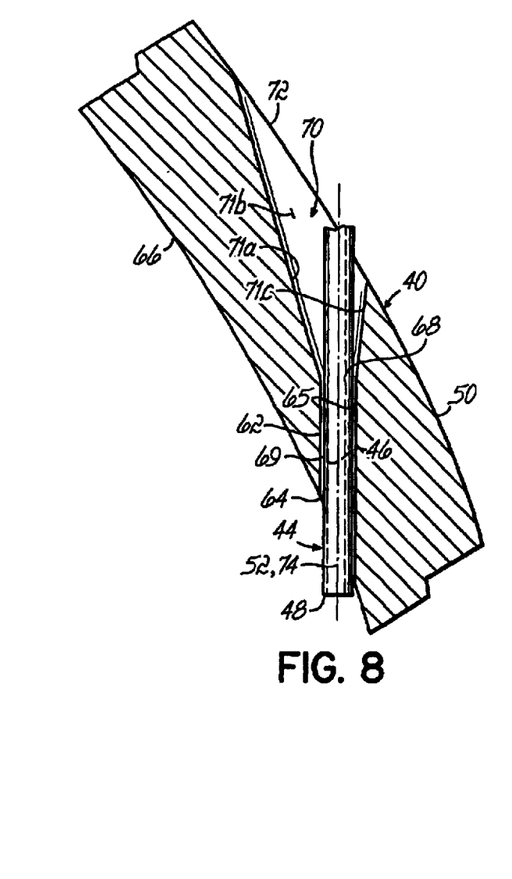
FIG. 8 is a cross-sectional side view of the complex hole illustrating the EDM tool at the end of a hole drilling process cutting an inlet portion of the complex hole of FIG. 1.

After determining that the diffuser shaping subroutine is completed, the motion controller then, at 218, provides output signals to the X, Y and Z servodrives 153, 154, 155 causing the EDM tool 44 to be returned to the hole shape depth position, such that the tool centerline 52 is colinear with the diffuser hole centerline as shown in FIG. 1A. The hole drilling process then proceeds, at 220, to determine tool wear and the Z-displacement required to cause the EDM tool 44 to drill the inlet portion as shown in FIG. 8. It should be noted that in cutting the diffuser 70, the sidewalls of the EDM tool experienced wear; and therefore, when drilling the inlet 62, the EDM wire tool 44 experiences substantially greater longitudinal wear than when drilling the initial hole 65. Thus, in drilling the inlet 62, the tool wear compensation may be set to a value that is several times greater than the tool wear compensation used to drill the initial hole 65. However, the substantial tool wear results in an EDM tool 44 having a true cylindrical shape with a generally square end, which is the desired tool shape to begin cutting the next hole. After determining tool wear, the motion controller, at 222, operates the W-axis servodrive 172 to advance the EDM tool 44 toward the component 40.

As shown in FIG. 8, the endpoint position of the tool end 48 is less critical when drilling the inlet portion 62 than when drilling to the hole shape depth 68. The less predictable tool wear in drilling the inlet portion 62 sometimes results in EDM tool 44 reaching the desired endpoint prior to finishing the inlet portion 62. Such a condition requires a redrilling of the inlet portion 62, which adds cost and processing time. Therefore, it is desirable to detect when the EDM tool 44 has completely formed the inlet orifice 64 and then, immediately stop the advancing motion of the EDM tool 44. That operation guarantees that the inlet portion is complete, and it also prevents the tool end 48 from contacting adjacent interior walls of the turbine component 40 and undesirably machining or scarfing those walls. However, known methods for detecting breakthrough of the EDM tool 44 also have some degree of unreliability; and therefore, must be implemented on a trial and error basis. However, the completion of the inlet portion is detected at 224, the motion controller 150 then commands, at 226, the W-axis servodrive 172 to return the EDM tool 44 to its starting position above the turbine component exterior surface 50. Upon detecting the EDM tool 44 being at the start position, at 228, the motion controller 150 then determines, at 230, whether the hole just drilled was the last hole in the program. If not, the motion controller then proceeds to read, at 200, the position coordinates of the next hole 60 and causes the EDM machine 38 to move the turbine component 40 and the EDM tool 44 such that the tool centerline 52 is colinear with the centerline of the next cooling hole to be drilled. Upon the motion controller 150 detecting, at 230, the last hole drilled, the hole drilling cycle ends.

The EDM hole drilling process described herein drills and shapes complex holes in a part accurately, quickly and less expensively than known methods. The complex holes are cut in one setup with a wire tool on a numerically controller multi-axes EDM machine. Thus, neither a laser drilling machine nor special, formed tooling is required, thereby substantially reducing the costs of tooling and machinery. Further, the positional accuracy and repeatability of the hole drilling process described herein is achieved with known relatively simple methods of tool wear compensation.

Further, the hole drilling process described herein has substantial flexibility. For example, the orientation of the hole centerline can be programmably and automatically changed from hole to hole without operator intervention. In addition, the size and shape of diffuser or shaped portion of the hole can be programmably and automatically changed from hole to hole without operator intervention.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the EDM hole drilling process described herein is directed to an application for drilling cooling holes in a turbine component, as will be appreciated, the described EDM hole drilling process can be used to drill holes in other parts, for example, fuel injectors, spray nozzles, combustors, stator blades, etc.

In the described embodiment, the hole shaping process of FIG. 4B shapes the diffuser 70 by moving the EDM tool 44 along paths at different locations, wherein the paths define planes substantially perpendicular to the hole centerline. Further, with each incremental retraction of the EDM tool 44, the direction of motion along the path is reversed, so that the EDM tool is moved along successive paths in alternate clockwise and counterclockwise directions.

Figure 4C:
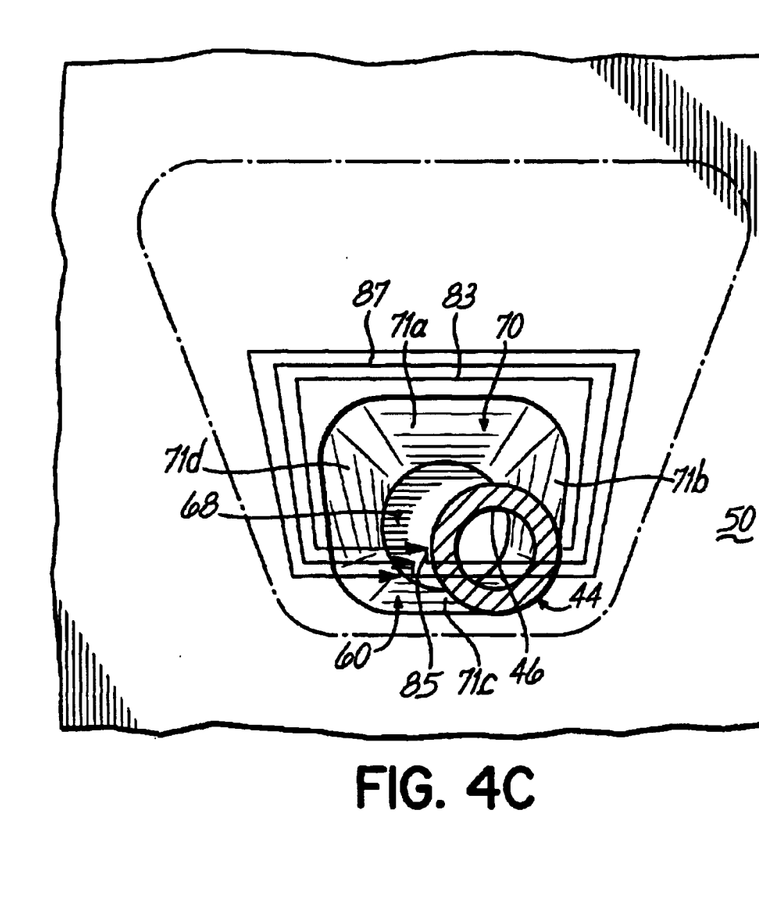
FIG. 4C is a top elevation view directed down the centerline of the complex hole schematically illustrating another embodiment for providing cutting paths of the EDM tool at the retracted positions shown in FIG. 4A.

As will be appreciated, in an alternative embodiment, the EOM tool 44 can be moved along all of the paths in the same direction, for example, the clockwise direction. Referring to FIGS. 4A and 4C, after the EDM tool 44 is retracted to the position 80, the motion controller then moves the EDM tool 44 in a first direction, for example, a counterclockwise direction, along a first cutting path 83, thereby cutting the desired shape of the diffuser 70 at the Z-axis position 80. Next, the EDM tool is retracted through another displacement as represented by the path 85 to the Z-axis position 84 (FIG. 4A). The motion controller 150 then provides output signals causing the EDM tool to move 44 in the same direction along a second cutting path 87, which cuts the desired shape of the diffuser 70 at the Z-axis position 84. That process of moving the EDM tool 44 in the same direction along paths at different depths continues until the complete diffuser 70 has been cut by the inside-out machining process. As the EDM tool approaches the end of the diffuser and begins cutting air, the cycle time can be optimized by increasing the EDM tool speed or altering the cutting path as previously described.

In the described embodiment, the complex hole is drilled by first drilling a blind hole 65, then shaping an outer portion 70 of the complex hole and thereafter, drilling an inlet through-hole portion 62. As will be appreciated, in other embodiments, the initial hole 65 can be drilled as a through-hole, the tool retracted to the hole shape depth 68 and then, the outer portion 70 of the complex hole shaped using the described inside-out hole shaping process.

In the described embodiment, the inlet portion 62 of the complex hole 60 is essentially the same diameter as the hole forming tool. As will be appreciated, in alternative embodiments, if an EDM process is being used, the inlet portion 62 may be of any shape, for example, it may be noncircular and cut larger than the diameter of the EDM tool using known orbiting tool processes. Further, the inlet portion 62 may be shaped using a hole shaping process similar to that described in FIG. 5. With the sample complex hole described herein, the intersection of the sidewalls 71 with the inlet portion 62 form a plane generally perpendicular to the hole centerline. However, with other complex hole shapes, the sidewalls may intersect the inlet portion to form a plane that is oblique to the hole centerline.

Further, in the described embodiment, the inside-out hole shaping process is used to cut a complex cooling hole. As will be appreciated, in an alternative embodiment, the inside-out hole shaping process can be used to shape a blind cavity in a part that does not have a through-hole or inlet portion. Therefore, the invention in its broadest aspects is not limited to the specific details shown and described. Consequently, departures may be made from the details described herein without departing from the spirit and scope of the claims which follow.

What is claimed is:

1. A method for forming a complex hole through a wall of a structure, the complex hole having an outer portion having a larger cross-sectional area adjacent a first surface of the wall, the complex hole having a smaller cross-sectional area within the wall, and the complex hole having an inner portion extending between the smaller cross-sectional area and an inlet opening on a second surface of the wall, the method comprising:

automatically forming with an EDM process an entry hole in the wall extending from the first surface to a first location inside the wall;

thereafter automatically cutting the outer portion of the complex hole with an EDM process by cutting the outer portion in a direction moving from the first location inside the wall toward the first surface; and thereafter, automatically forming the inner portion of the complex hole with an EDM process.

2. The method of claim 1 further comprising drilling the entry hole with an EDM tool having a cross-sectional area substantially equal to the smaller cross-sectional area.

3. The method of claim 2 further comprising drilling the entry hole with an EDM tool having a substantially circular cross-sectional area.

4. The method of claim 1 wherein the first location corresponds to a location of intersection of the outer portion with the inner portion.

5. The method of claim 4 further comprising advancing an EDM tool through the first surface and into the wall to the first location to form the entry hole.

6. The method of claim 5 further comprising:

retracting the EDM tool through an incremental displacement from the first location toward the first surface to a second location;

then moving the EDM tool in a direction substantially perpendicular to a longitudinal centerline of the tool along a first path corresponding to a desired shape of the outlet portion at the second location; and iterating the above steps of retracting and then moving the EDM tool from the outer portion of the complex hole.

7. The method of claim 5 further comprising:

retracting the EDM tool from the first location toward the first surface to a second location;

then, moving the EDM tool along a first path corresponding to a desired shape of the outer portion at the second location;

next, retracting the EDM tool from the second location toward the first surface to a third location; and thereafter, moving the EDM tool along a second path corresponding to a desired shape of the outer portion at the third location.

8. The method of claim 7 wherein the first path and the second path are in respective planes substantially perpendicular to a centerline of the EDM tool.

9. The method of claim 8 further comprising:

moving the EDM tool along the first path in a first direction; and moving the EDM tool along the second path in an opposite direction.

10. The method of claim 9 wherein the complex hole has a centerline oblique to the first surface and the method further comprises:

while moving the EDM tool along the first path in the first direction, detecting the EDM tool exceeding a desired spacing with the wall;

terminating motion of the EDM tool along the first path in response to detecting the EDM tool exceeding the desired spacing; and thereafter, initiating motion of the EDM tool along the second path.

11. The method of claim 10 further comprising:

detecting an open circuit condition while moving the EDM tool along the first path;

terminating motion of the EDM tool along the first path in response to detecting the open circuit condition; and thereafter, initiating motion of the EDM tool along the second path.

12. The method of claim 2 wherein the EDM tool is a wire tool and the method further comprises rotating the EDM tool.

13. The method of claim 12 wherein the EDM tool is hollow and the method further comprises establishing a flow of dielectric through the EDM tool.

14. A method for forming a cooling hole through a wall of a structure, the cooling hole having a diffuser with an outlet of a larger cross-sectional area on a first surface of the wall, the diffuser tapering to a smaller cross-sectional area within the wall, and the cooling hole having a through-hole extending from the smaller cross-sectional area to a second surface of the wall, the method comprising:

first, drilling with an EDM tool an entry hole in the wall extending from the first surface to a location inside the wall;

then, automatically forming with the EDM tool the diffuser starting at the location inside the wall and moving toward the first surface; and thereafter, forming with the EDM tool the through-hole.

15. The method of claim 14 further comprising forming with the EDM tool the through-hole having a constant cross-sectional area substantially equal to the smaller cross-sectional area.

16. The method of claim 15 further forming with the EDM tool the through-hole having a substantially circular cross-sectional area.

17. The method of claim 14 further comprising providing a rotating EDM wire tool as the EDM tool.

18. The method of claim 17 wherein the rotating EDM wire tool has an interior passage and the method further comprises providing a flow of dielectric through the interior passage of the rotating EDM wire tool.

19. A method of forming a cooling hole in an air-cooled component of a gas turbine engine, the component having a wall with an outer surface and an inner surface, the cooling hole having a diffuser portion extending between an outlet opening having a larger cross-sectional area on the outer surface and a smaller cross-sectional area location inside the wall portion, and an inlet portion extending between the smaller cross-sectional area location and an inlet opening on the inner surface, the method comprising:

drilling with an EDM tool an entry hole from the outer surface to the smaller cross-sectional area location;

then, forming the diffuser with the EDM tool by first removing material closer to the smaller cross-sectional area location and thereafter, removing material closer to the outlet opening on the outer surface, and thereafter, removing with the EDM tool material between the smaller cross-sectional area location and the inlet opening to form the inlet portion.

20. The method of claim 19 further comprising providing a rotating EDM wire tool as the EDM tool.

21. The method of claim 20 wherein the rotating EDM wire tool has an interior passage and the method further comprises providing a flow of dielectric through the interior passage of the rotating EDM wire tool.

* * * * *